No Printed Specification Available
6725X
B. Todd.
Horse Power
Patented Aug. 24, 1831
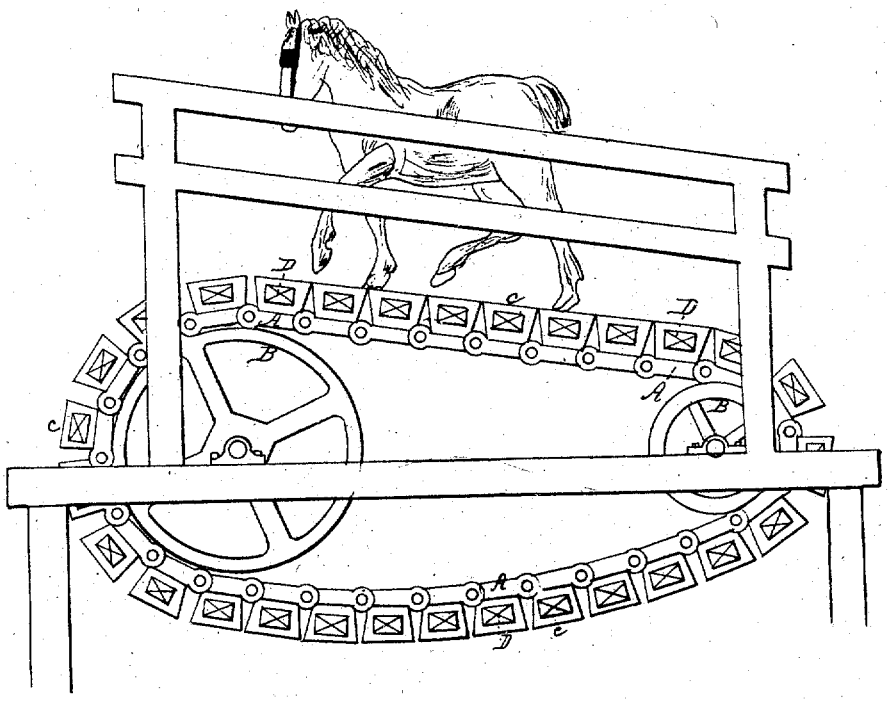

Aug. 24. 1831 [illegible]

6725 X

Billy Todd, of Marietta State of Ohio

Letters Patent.

The schedule referred to in these Letters Patent and making part of the same containing a description in the words of the said Billy Todd himself of his improvement to be used in propelling boats, mills and various kinds of machinery called the self supporting chains.

To all to whom these presents shall come
Be it known that I Billy Todd of Marietta in the County of Washington and State of Ohio have invented a new and useful improvement for propelling Boats, Mills and various kinds of Machinery called the self supporting chains; and that the following is a full and exact description of the same in its construction and operation as invented by me, Schedule —

Two cast iron chains are made in the following manner, to wit, the links are connected at the ends in form of tenons and mortises and held together by wrought iron rivets. These two chains are made to pass over and around two shafts and connected at the ends, On each of these links is a projection on the outside, like the key stone of an arch which supports the chains between and over the two shafts, like an arch on which a floor is built by putting the ends of a plank through an opening in each link made for that purpose, in the form of a mortice on which water or animal power may be applied without sagging the arch floor, The links of these self supporting chains, sufficient for a two horse power, should be about six inches from one rivet hole to the other, and six inches from the same holes to the upper part of the key or brace of the link, the mortice holes in the links for inserting the planks for the floor should be four inches long and two inches wide, The links will weigh about twelve pounds each.

The [illegible] expects and also claims the right of using the

8/24/1831 6125X above described chains for propelling Boats, mills, and all kinds of machi-
-nery either by animal or water power by placing them around two shafts
and by building a floor on the chains, for animals to walk on, by placing
buckets in form of the buckets in an overshot wheel, on the floor when
propelled by water, and he would also claim the right of placing and va-
-rying the two shafts, one higher than the other, as the circumstances may
require, either for water, or different kinds of animal power, according
to the fall of the water, or power or ability of the animals &c.
And he would also claim the right of varying the size of the chains
as well as the length according to the nature of the machinery to be
propelled and also of using other materials than cast iron for the
chains, if the nature of the case may require, provided he does not
alter the nature of the chains other than the size and the materials Witnesses
John Brough; }
Silas Cook, }

Billy Todd.

546 no:

Enrd.
Chfd.

Patented 24 August 1831
(Drawing made)